(12) United States Patent
Hallett

(10) Patent No.: US 8,193,768 B2
(45) Date of Patent: Jun. 5, 2012

(54) CONTACTLESS CHARGING SYSTEM FOR MUSICAL INSTRUMENTS

(75) Inventor: Jason S. Hallett, Long Tree, CO (US)

(73) Assignee: Jason S. Hallett, Dublin, CA (US)

( * ) Notice: Subject to any disclaimer, the term of this patent is extended or adjusted under 35 U.S.C. 154(b) by 354 days.

(21) Appl. No.: 12/392,529

(22) Filed: Feb. 25, 2009

(65) Prior Publication Data

US 2009/0218985 A1 Sep. 3, 2009

Related U.S. Application Data

(60) Provisional application No. 61/032,173, filed on Feb. 28, 2008.

(51) Int. Cl.
*H02J 7/00* (2006.01)

(52) U.S. Cl. ......................... 320/108; 320/119

(58) Field of Classification Search .................... 320/108
See application file for complete search history.

(56) References Cited

U.S. PATENT DOCUMENTS

| | | |
|---|---|---|
| 3,194,870 A | 7/1965 | Tondreau et al. |
| 3,938,018 A | 2/1976 | Dahl |
| 4,529,865 A | 7/1985 | Oakes, Jr. |
| 4,546,688 A | 10/1985 | Cuccio |
| 4,561,339 A | 12/1985 | Jensen |
| 4,691,610 A | 9/1987 | Gilbert |
| 5,122,729 A | 6/1992 | Itoga et al. |
| 5,161,761 A | 11/1992 | May |
| 5,313,866 A | 5/1994 | Smith |
| 5,498,948 A | 3/1996 | Bruni et al. |
| 5,506,489 A | 4/1996 | Abbott et al. |
| 5,664,756 A | 9/1997 | Liao |
| 5,726,369 A | 3/1998 | Gilday |
| 5,929,355 A | 7/1999 | Adinolfi |
| 5,934,628 A | 8/1999 | Bosnakovic |
| 5,952,814 A | 9/1999 | Van Lerberghe |
| 5,959,225 A | 9/1999 | Hsu |
| 5,959,433 A | 9/1999 | Rohde |
| 6,100,663 A | 8/2000 | Boys et al. |
| 6,118,249 A | 9/2000 | Brockmann et al. |
| 6,179,135 B1 | 1/2001 | Simpson |
| 6,184,651 B1 | 2/2001 | Fernandez et al. |
| 6,191,350 B1 | 2/2001 | Okulov et al. |
| 6,296,213 B1 | 10/2001 | Law, III et al. |
| 6,323,406 B1 | 11/2001 | Park |
| 6,422,522 B1 | 7/2002 | Woollen |
| 6,586,909 B1 * | 7/2003 | Trepka .......................... 320/108 |

(Continued)

FOREIGN PATENT DOCUMENTS

WO  WO 2005/053289  6/2005

(Continued)

*Primary Examiner* — Ramy Ramadan
*Assistant Examiner* — Robert Grant
(74) *Attorney, Agent, or Firm* — Sampson & Associates, P.C.

(57) ABSTRACT

A contactless charging system for an electric musical instrument includes an instrument stand configured to support a musical instrument, and which includes a contactless charging port configured for connection to a power source such as an electric wall outlet. A charging circuit module is configured for incorporation within the musical instrument, and includes a second contactless charging port in physical electrical contact with circuit elements configured to provide at least one predetermined voltage to at least one rechargeable portable power supply. The second contactless charging port is configured for contactless charging engagement with the first contactless charging port, so that the second port receives power from the power source when the instrument is placed in the stand.

23 Claims, 6 Drawing Sheets

U.S. PATENT DOCUMENTS

| | | |
|---|---|---|
| 6,693,234 B2 | 2/2004 | Smith |
| 6,808,153 B1 | 10/2004 | Kelley |
| 6,835,883 B2 | 12/2004 | Stevens |
| 6,891,099 B1 | 5/2005 | Davis et al. |
| 7,180,265 B2 | 2/2007 | Naskali et al. |
| 7,342,162 B2 | 3/2008 | Tai |
| 7,402,746 B2 | 7/2008 | Saenz |
| 7,471,062 B2 | 12/2008 | Bruning |
| 2003/0009308 A1 | 1/2003 | Kirtley |
| 2003/0196542 A1 | 10/2003 | Harrison, Jr. |
| 2004/0004559 A1 | 1/2004 | Rast |
| 2004/0145567 A1* | 7/2004 | Ho .............................. 345/163 |
| 2005/0085122 A1 | 4/2005 | Chiou |
| 2005/0156563 A1 | 7/2005 | Lin et al. |
| 2006/0000347 A1 | 1/2006 | Preece |
| 2006/0087282 A1* | 4/2006 | Baarman et al. .............. 320/108 |
| 2006/0289444 A1 | 12/2006 | Jackson et al. |
| 2007/0000375 A1* | 1/2007 | Harrison, Jr. .................. 84/737 |
| 2007/0049071 A1 | 3/2007 | Jackson et al. |
| 2007/0182367 A1* | 8/2007 | Partovi ......................... 320/108 |
| 2007/0240560 A1 | 10/2007 | Plamondon |
| 2008/0163736 A1 | 7/2008 | Demsey et al. |
| 2008/0284380 A1* | 11/2008 | Chen et al. .................... 320/154 |

FOREIGN PATENT DOCUMENTS

| WO | WO 2007/132235 | 11/2007 |
|---|---|---|

* cited by examiner

CONTACTLESS CHARGING SYSTEM FOR MUSICAL INSTRUMENTS

RELATED APPLICATIONS

This application claims the benefit of U.S. Provisional Patent Application Ser. No. 61/032,173, entitled A Contactless Charging System for a Musical Instrument Stand, filed Feb. 28, 2008.

TECHNICAL FIELD

This invention relates to the recharging of multiple batteries of different voltages utilized in electric musical instruments by use of contactless charging such as by induction.

BACKGROUND INFORMATION

As the field of electronics has grown, so has its involvement with musical instruments. One case in point is the electric guitar. The early hollow body electric guitars were introduced at the beginning of the 1930's. Within a decade the solid body electric guitar, most familiar today, would follow. Solid body electric guitars lack the acoustic chamber to amplify the sound of the strings. Consequently, they produce relatively little sound themselves. In order to resolve this problem electric guitars relied on "pickups." The pickup was a passive solid state device embedded in the body of the guitar beneath the strings. It contained a series of magnets wrapped in very fine wire. Each magnet corresponded to a string and when the string vibrated, that string would induce a current, proportional to that vibration, in the wire around the magnet. This current would then be transmitted via a cable which ran from the guitar to an amplifier. The amplifier would then step up the original signal to produce an amplified sound that would accord with the sound of the strings on the guitar.

This early design of the electric guitar, still available today, did pose certain technical problems. One of these problems was the physical inconvenience of the cable that ran from the guitar to the amplifier, particularly when performing musicians moved around on a platform or stage. The cable could become tangled, providing a safety hazard, or pull loose from either the guitar or amplifier interrupting the signal and the performance. This led to the introduction of wireless transmitters that could be attached to the guitar.

Another problem lay in the pickups themselves. By their very nature pickups were susceptible to magnetic flux. Magnetic pickups tend to pick up ambient, and usually unwanted, electromagnetic noises. The resulting noise, the so-called "hum", is particularly strong with single-coil pickups, and aggravated by the fact that very few guitars are correctly shielded against electromagnetic interference. A common cause is the relatively strong 50 or 60 Hz electromagnetic noise associated with the distribution of conventional line voltage (e.g., 110 or 220 Volt AC). As nearly all amplifiers and audio equipment associated with electric guitars rely on this power, there is in theory little chance of completely eliminating the introduction of unwanted hum. One attempted solution was the introduction of so called "active pickups." This innovation essentially incorporated an electronic pre-amp into the pickup in order to compensate for the extraneous electromagnetic influences and provide a better, cleaner sound.

Both wireless transmitters and active pickups are examples of self contained electronic devices incorporated into the instrument itself. This required a new element in a now truly electric guitar: an independent power source. In order to power these electronic devices, batteries are carried by the musician or implanted in the instrument. These batteries are typically of differing voltages and require periodic replacement or, as may be preferred, recharging. In keeping with the benefits of the modern autonomous electric instrument it is desirable that this be accomplished while maintaining that autonomy and consequently the greatest possible convenience for the musician. Some methods have been proposed such as forming an electrical circuit using metal contacts. One problem with this approach is that the contact points may be degraded by deposits or oxidation and fail to make a reliable connection. It is also undesirable both aesthetically and for the physical and tonal integrity of an instrument to make multiple penetrations into the instrument in order to charge multiple batteries. It would therefore be desirable to find an unobtrusive and minimally intrusive means of recharging one or more batteries of varying voltages in an electric musical instrument without disconnecting the batteries from the instrument, making multiple penetrations, or requiring the use of a fixed cable.

SUMMARY

In one aspect of the present invention, a contactless charging system for an electric musical instrument includes an instrument stand configured to support a musical instrument. The instrument stand has a contactless charging port attached to it. This first contactless charging port is connected to a power source, such as an electric wall outlet. A charging circuit module is configured to be attached to a musical instrument in physical electrical contact. The charging circuit module includes a second contactless charging port disposed in physical electrical contact with circuit elements configured to provide at least one predetermined voltage to at least one rechargeable portable power supply. The second contactless charging port is configured for contactless charging engagement with the first contactless charging port, so that it receives power from the power source.

In another aspect of the present invention, an electric musical instrument includes a body having at least one electronic instrument component disposed thereon, and a charging circuit module disposed on the body in physical electrical contact with the electronic instrument component. At least one rechargeable power supply is disposed in physical electrical contact with the charging circuit module. A contactless charging port is disposed in physical electrical contact with the charging circuit module. The contactless charging port is configured for contactless charging engagement with a power source to supply power to at least one portable rechargeable power supply.

In still another aspect, a method for enabling an electronic musical instrument to be charged includes configuring an instrument stand to support a musical instrument thereon. A first contactless charging port is integrally mounted on the music stand, and is configured for substantially continuous physical electric contact with a power source. A charging circuit module is configured for being disposed on the musical instrument in physical electrical contact therewith. The charging circuit module is provided with circuit elements configured to provide at least one predetermined voltage to at least one rechargeable power supply. A second contactless charging port is placed in physical electrical contact with the circuit elements. The second contactless charging port is configured for contactless charging engagement with the first contactless charging port to receive power from the power source when the instrument is supported by the stand.

Another aspect to the invention is a contactless charging system for an electric stringed instrument. This system includes an instrument stand configured to hold the instrument. The instrument stand includes a first contactless charging port connected to the instrument stand and an electrical cord connected to the charging port and configured to supply electricity to the port when the cord is attached to an electrical outlet. The system further includes a charging module having a second contactless charging port configured to mate and be contactlessly electrically coupled with the first contactless charging port on the instrument stand. The second charging port is electrically coupled to a circuit that can manipulate electricity providing multiple voltages for charging. This circuit is electrically connected to at least one rechargeable battery. The battery, or batteries, are in turn connected to at least two electronic components which are connected to the instrument.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
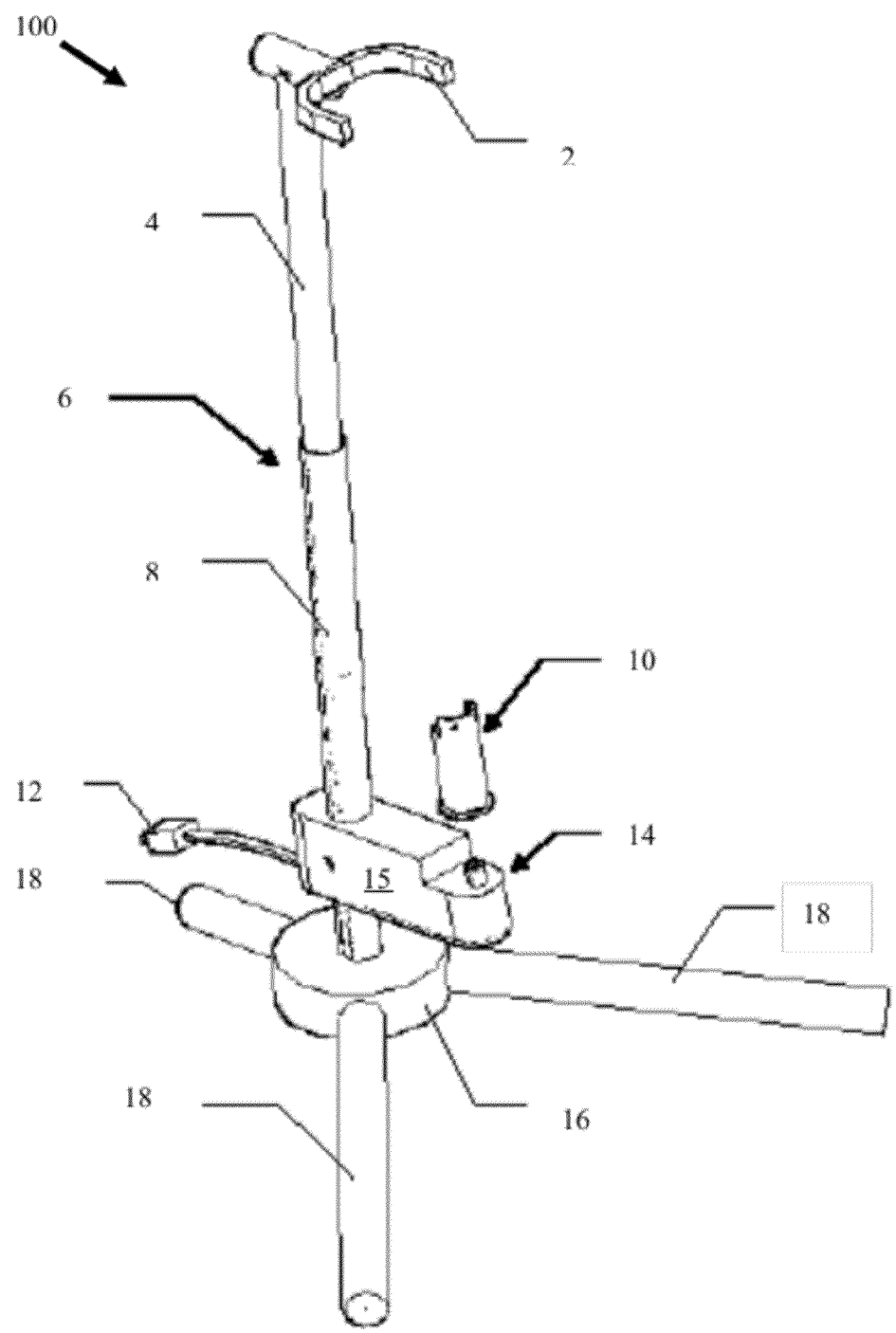
FIG. 1 is a perspective view of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Where used in this disclosure, the term 'axial' when used in connection with inductive coils refers to a direction substantially perpendicular to the plane containing a loop of the coils and running substantially through the center of the coil loops. The term 'align' or 'alignment' when used in connection with inductive coils refers to positioning of the coil pair so that they are co-axial with one another and positioned within such proximity that the interaction of the magnetic field generated by a first coil acts to generate a usable current in the second coil without physical contact therebetween. 'Contactless electrical coupling' refers to such a transfer of electrical energy without physical contact, such as by induction. The terms 'physical electric contact' and/or 'physical electrical contact' refer to conventional electrical contact provided by direct contact with conventional circuit elements such as wires or leads.

An embodiment of the present invention includes a musical instrument stand fitted with a first inductive coil for contactless charging. The coil, mounted on the stand, is connected to a power source such as a wall socket. A second inductive coil is configured to mate in non-contact alignment with the first coil and is mounted on the instrument either internally or externally thereto. When the second coil is placed in mating alignment with the first coil an electrical current is generated in the second coil. In this embodiment, the second coil is connected to a circuit which divides and adjusts the voltage of the power induced in the second coil, to simultaneously supply multiple voltages of different values to multiple batteries. These batteries in turn are connected to electronic components on the instrument. When the instrument is removed from the stand these batteries independently supply appropriate voltage to the electronic components on the instrument. When the instrument is placed on the instrument stand, and the inductive coils are mated, the batteries are recharged.

In a particular representative application, the musical instrument is an electric guitar having a first rechargeable battery or batteries configured to supply power at a first voltage to an active pickup, while another rechargeable battery or batteries are configured to supply power at another voltage to a wireless transmitter. Optionally, a conventional indicator light or other signal device may also be connected to the rechargeable batteries and employed to notify the user of low battery levels.

Embodiments of the invention may also be configured as one or more modules that may be used to effectively retrofit an existing electronic musical instrument. For example, these embodiments may include the aforementioned instrument stand, and a module configured for attachment to the instrument. The module may include the aforementioned components configured to form a contactless electrical connection with the stand and provide a predetermined voltage for one or more rechargeable batteries associated with the instrument.

Still further embodiments may include a musical instrument having the aforementioned module disposed integrally therein. These embodiments may thus minimize or effectively eliminate the visual impact of the module, such as by placing it within the body of the instrument. In an embodiment where induction is used, the coil associated with the module may be disposed at the approximate location where an instrument strap is normally attached. As an additional option, a strap may be configured to attach to the instrument at this point. For example, in the event the coil is disposed in a housing that protrudes from the end of the instrument, this housing may be sized and shaped for receipt within a grommet or other fastener associated with the strap. Alternatively, in the event the coil is disposed within a receptacle, then a plug or pin associated with the strap may be received therein to secure the strap to the instrument when the instrument is in use.

It should be recognized that embodiments of the present invention may be used with any number of instruments, including both stringed and non-stringed instruments, which may utilize electronic components for sound amplification, modification, wireless transmission, or other affects. Some examples of instruments that may utilize electronic components are horns, drums, stringed instruments and others, which, for example, may be equipped with wireless microphones that may be recharged in accordance with the various embodiments discussed herein.

Advantageously, embodiments disclosed herein do not require electrical connection by direct physical contact, so that problems associated with the fouling (by dirt or corrosion for example) of exposed metal contacts are substantially eliminated. The corresponding risk of a poor electrical connection with such exposed metal contacts, and the unexpected discovery of uncharged batteries is thus greatly reduced. Moreover, embodiments of the invention may provide the aforementioned contactless charging at various voltages without any additional penetrations into the instrument body.

As technology has advanced so has the number of electronic components available for musical instruments. The various embodiments disclosed herein allow the musician to keep those components charged and functioning without any extra steps, e.g., simply by virtue of periodically setting the instrument in an instrument stand in a substantially conventional manner. This placement within the stand serves to align the coils to effect charging. This eliminates a need to run electrical wires to the instrument or remove and replace used batteries. This also tends to provide an environmental benefit by reducing the use and consumption of disposable batteries.

Turning now to the figures, embodiments of the present invention will be discussed in detail. Referring to FIG. 1, in one embodiment, an inductive charging stand (100) includes a first coil housing (14) incorporated into a stand (6) for a stringed instrument such as a guitar. This stand is configured to be supported on a horizontal surface. Legs (18) are connected to a base (16) which in turn supports a vertical strut (8) and charger base (15). A telescoping upper strut (4) allows for some adjustment and/or may be conveniently removed for transport. A neck holder (2) supports the neck of the instrument. An electrical cord (12), e.g., for plugging into a conventional wall outlet, conveys an electric current to the first coil (36) (FIGS. 2A & 2B) disposed within the housing (14). A second coil (34) (FIGS. 2A & 2B) is disposed within a second housing (10) that is configured to mate in an electrically contactless manner with the first coil housing (14).

Figures 2A, 2B:
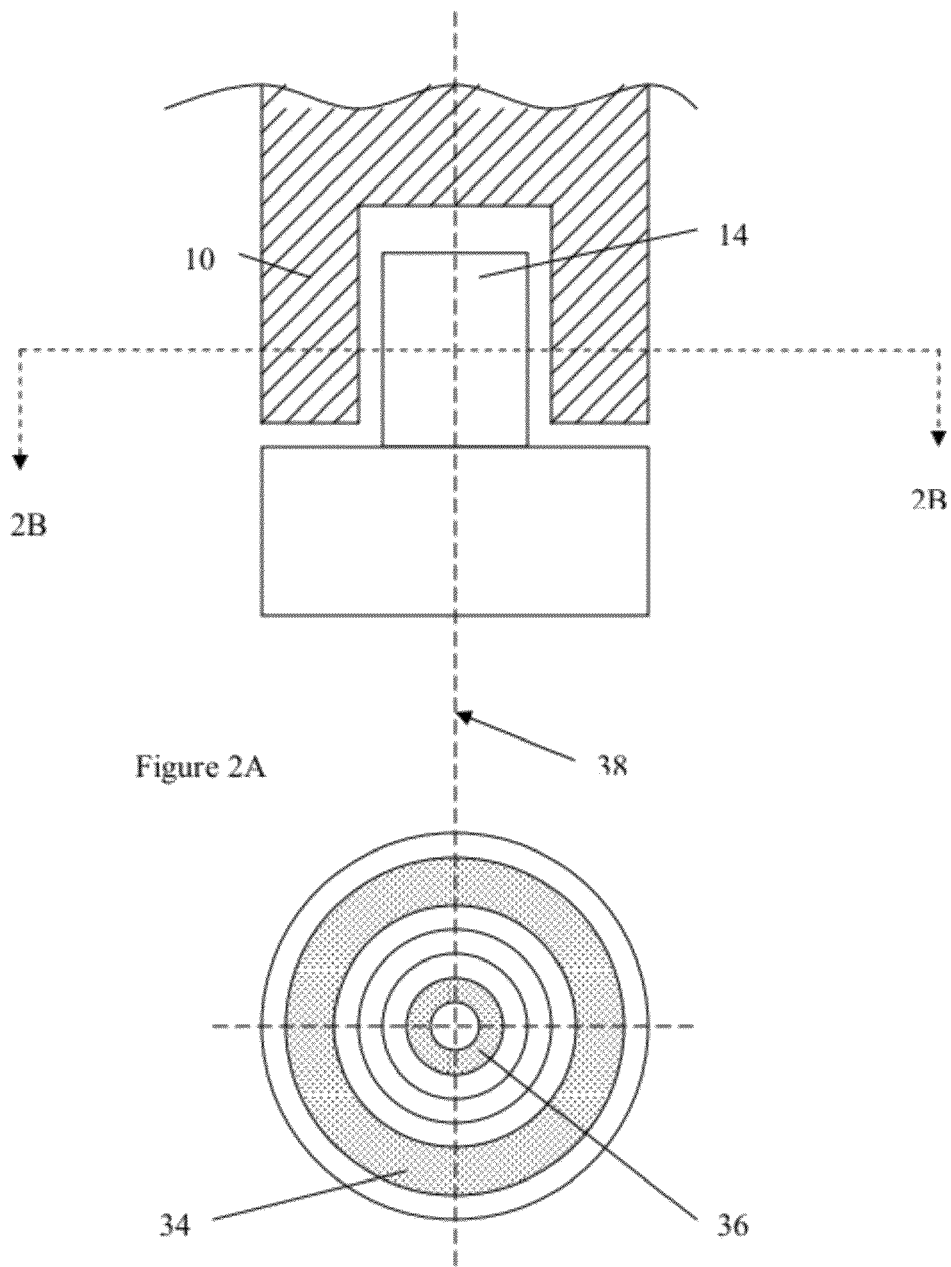
FIG. 2A is a schematic cross sectional elevational view of a portion of the embodiment of FIG. 1.
FIG. 2B is a cross sectional view taken along 2B-2B of FIG. 2A.

As shown in FIGS. 2A and 2B, mating of the two coils (34), (36) is effected by placing the second coil housing (10) over the first coil housing (14), e.g., so that both coils are substantially coaxially aligned, such as with axis 38. Once so aligned, a magnetic field generated by current in the first coil (36) induces a current in the second coil (34).

Figure 3:
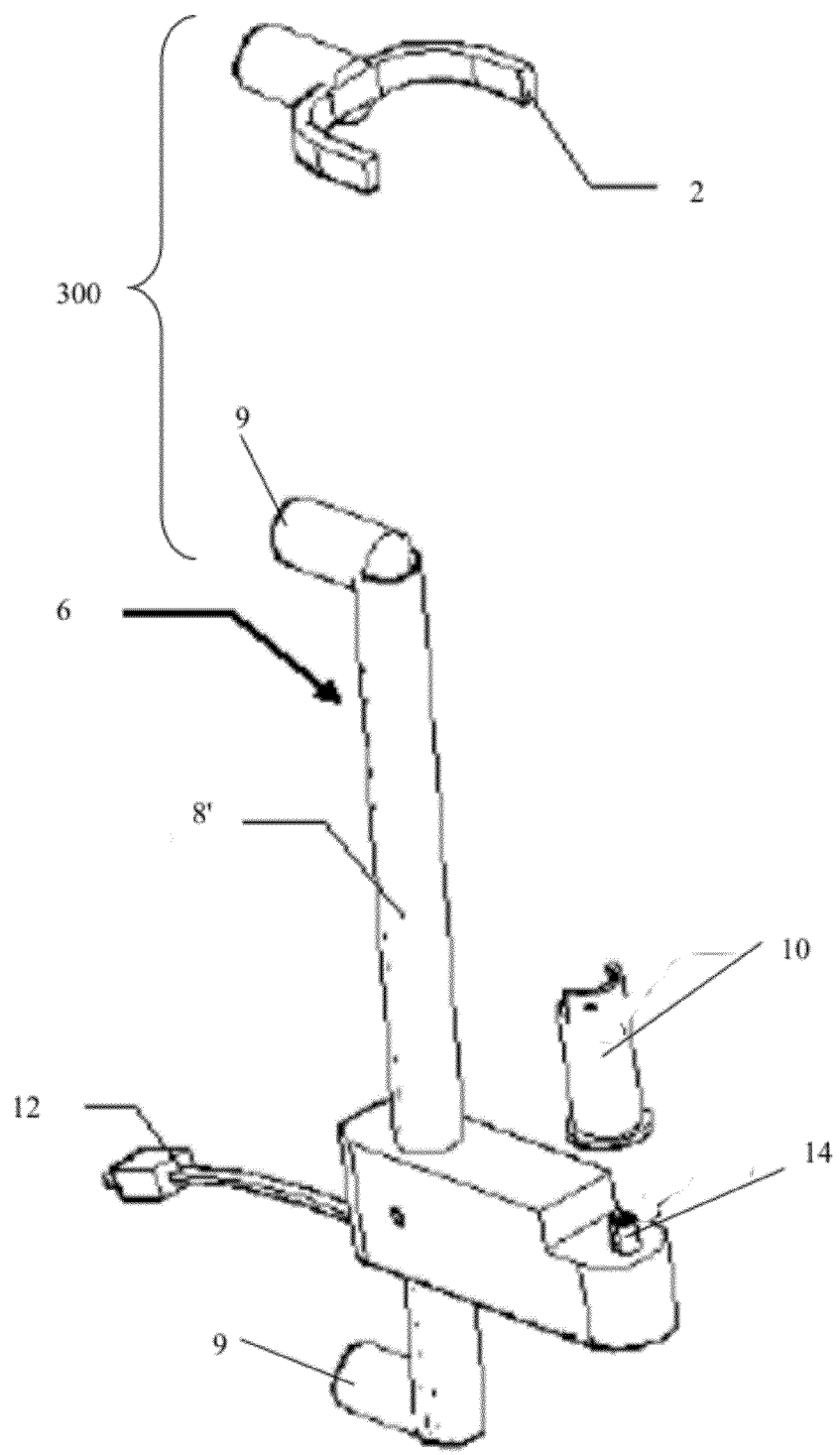
FIG. 3 is an elevational view of an alternate embodiment of the present invention.

Referring now to FIG. 3, an alternate embodiment includes an inductive charging stand (300) which is substantially similar to stand (100) of FIG. 1, while being configured for mounting on a substantially vertical, rather than horizontal, surface. This may be accomplished, for example, by providing vertical strut (8') with anchor portions (9) extending substantially at right angles therefrom. These anchor portions may thus be fastened to a vertical surface using any number of conventional connective devices known to those skilled in the art (e.g. screws, nails, glue, adhesives, brackets, etc.).

Figure 4:
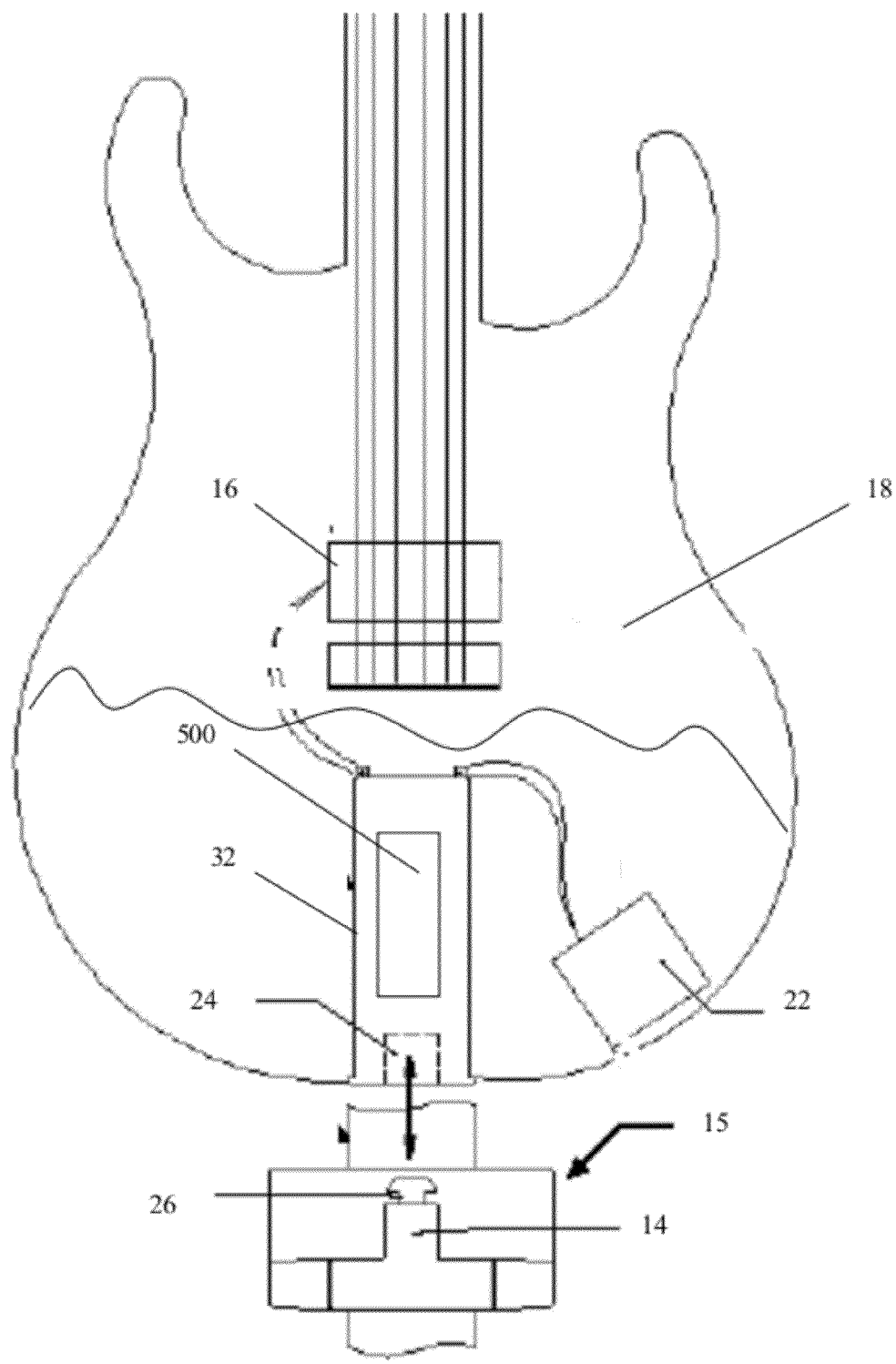
FIG. 4 is a schematic, partially broken away elevational view, with portions shown in phantom, of an electric guitar including various aspects of the embodiments of FIGS. 1-3.

Turning now to FIG. 4, aspects of the foregoing embodiments are shown in a representative application, i.e., in conjunction with an electric guitar (18). Contactless charger base (15) including first coil housing (14) and coil (36) (FIGS. 2A & 2B) is shown beneath a receptacle port (24) of guitar (18), about which second coil (34) (FIGS. 2A & 2B) is wound. Although receptacle port (24) is shown and described as being disposed on the instrument (18) with its male counterpart, housing (14) on the base (15), it should be recognized that these components may be effectively reversed so that charger base (15) is configured with a receptacle port, while the instrument (18) includes the male counterpart.

Optionally, a switch (26) (e.g., in the form of a contact or proximity sensor) may be utilized to activate the flow of electric current to the first coil (36) (FIGS. 2A & 2B) within housing (14). The switch (26) may be triggered in any conventional manner, such as by the weight of guitar (18) applied thereon, and/or the proximity of guitar (18) thereto. In the exemplary embodiment shown, such placement of guitar 18 serves to lower receptacle (24) onto the charger base assembly (15), to optionally trigger switch (26) and supply power to the first coil of housing (14). This placement also serves to axially align the first and second coils (34, 26) as discussed above, to inductively supply power to the second coil (34) (FIGS. 2A & 2B) within housing (10) and then to a coil circuit (500) contained within a charging module (32). The coil circuit (500) is configured to adjust the current as required to output power at one or more predetermined voltages and currents sufficient to charge one or more rechargeable power supplies which are in turn connected to the guitar's electronic components. In the particular example shown, components may include active pickups (16) and/or a wireless signal transmitter (22).

Figure 5:
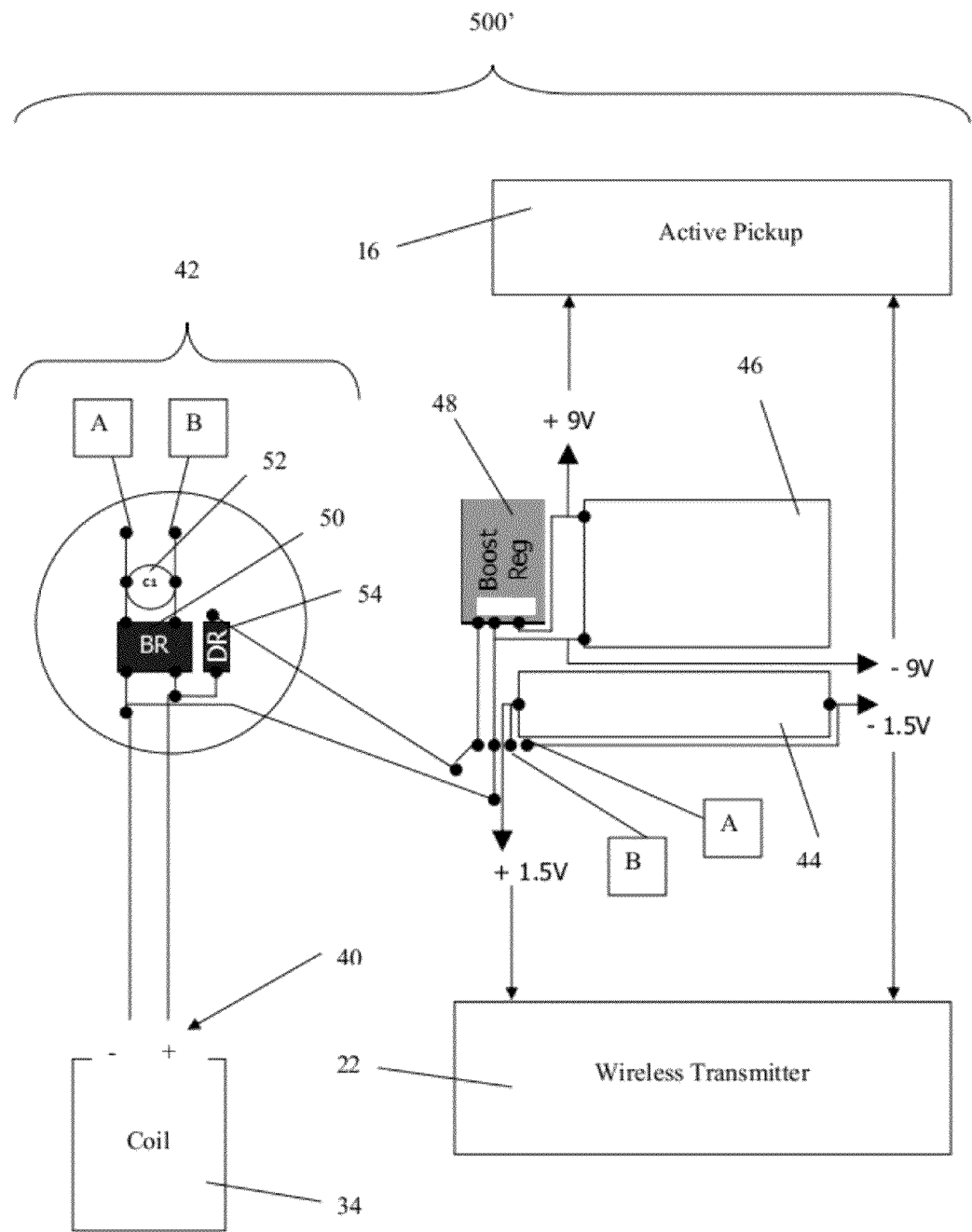
FIG. 5 is a block diagram of various exemplary circuit elements associated with the foregoing embodiments.

Turning now to FIG. 5 an exemplary coil circuit configured for use with a plurality of rechargeable power supplies is shown at (500'). A potential difference (voltage) between the positive and negative poles (40) of the second coil (34) is induced upon its axial alignment with coil (36) as discussed hereinabove. This voltage creates a current in the coil circuit (500'). In the first stage (42) of the circuit (500') the current is split into two sub circuit loops, one of which runs through a first battery (44) at a first voltage, and the other runs through a second battery (46) at a second voltage. (Note: for the sake of clarity, it should be recognized that the circuit elements shown connected to boxes labeled "A" and "B" are intended to be directly connected with their respective counterparts). As shown, the sub circuit that runs through second battery (46) may direct electricity from the coil (40) through a diode rectifier (54) that converts the current from alternating current (AC) to direct current (DC). Electricity then may pass through a Boost Regulator (48) that steps up the voltage to the second voltage. In the particular exemplary embodiment shown, boost regulator (48) is configured to step voltage up to 9 Volts (V), to charge a 9V battery (46). Such a battery may in turn be used to power an electronic component (16) which runs on 9V. Examples of components (16) that may use 9 volts include Nady UB-4™ wireless transmitters (Nady Systems, Inc., Emeryville, Calif.) and EMG™ active pickups (EMG, Inc., Santa Rosa, Calif.).

The other sub circuit connected to battery (44) may include components such as a bridge rectifier (50) that converts AC current to DC current and a capacitor (52) that smooths the output of the rectifier to charge the first battery (44). In the embodiment shown, battery (44) is a 1.5V battery, such as a AA size battery. The 1.5V battery may be used to power a component such as an electronic wireless transmitter (22) (e.g., a WMS 40 Pro™ wireless transmitter available from AKG (Harman International Industries, Inc. Woodbury, N.Y.). Due to the relatively low voltage, a boost regulator may not be necessary in this embodiment to step up the voltage. However, a boost regulator may be used to step up the voltage in the event a higher voltage is desired.

In the embodiment shown, both a diode rectifier (54) and a bridge rectifier (50) (with capacitor) are shown as alternative means for converting AC to DC. Those skilled in the art will recognize that substantially any AC to DC converter may be used, depending on the needs of the particular embodiment and application, without departing from the spirit and scope of the present invention. Indeed, in the embodiment shown, a diode rectifier (54) is used in one of the sub-circuits, despite some potential inefficiencies relative to many bridge rectifiers, in order to supply a sufficiently high input voltage to the boost regulator (48). For example, the AnyVolt Micro™ boost regulator (discussed below), such as used at (48), has an adjustable input and output range of 2.6V-14V which tends to preclude its use with bridge rectifier (50), which in the embodiment shown, outputs a lower 1.5 volts.

The coil circuit (500') shown is only intended to be representative of one configuration for providing multiple voltages and not viewed as restrictive. Rather, substantially any circuit configuration capable of matching current from coil (34) to mutually distinct requirements of a plurality of rechargeable power supplies may be used without departing from the scope of the present invention.

Although this embodiment of is not to be viewed as restrictive, the following commercially available components may be used for the assembly of the circuit (500'): a diode rectifier (54) such as No. 1N4007 commercially available from Fairchild Optoelectronics Group (South Portland, Me.); a capacitor (52) such as No. C320C103K2R5TA commercially available from Kemet Corp. (Greenville, N.C.); a bridge rectifier (50) such as No. DB101-BP commercially available from Micro Commercial Components Corp. (Chatsworth, Calif.); and a boost regulator (48) such as the AnyVolt Micro™ commercially available from Dimension Engineering, LLC (Akron, Ohio).

It should be recognized that substantially any suitable rechargeable power supply may be used for power supplies 44, 46. For example, nickel cadmium and/or lithium ion rechargeable batteries, or substantially any other type of rechargeable batteries currently available, or as may be developed in the future, may be used. Moreover, the present invention does not restrict itself to batteries, but may use substantially any device, including capacitors and the like, capable of rechargeably providing power.

Figure 6:
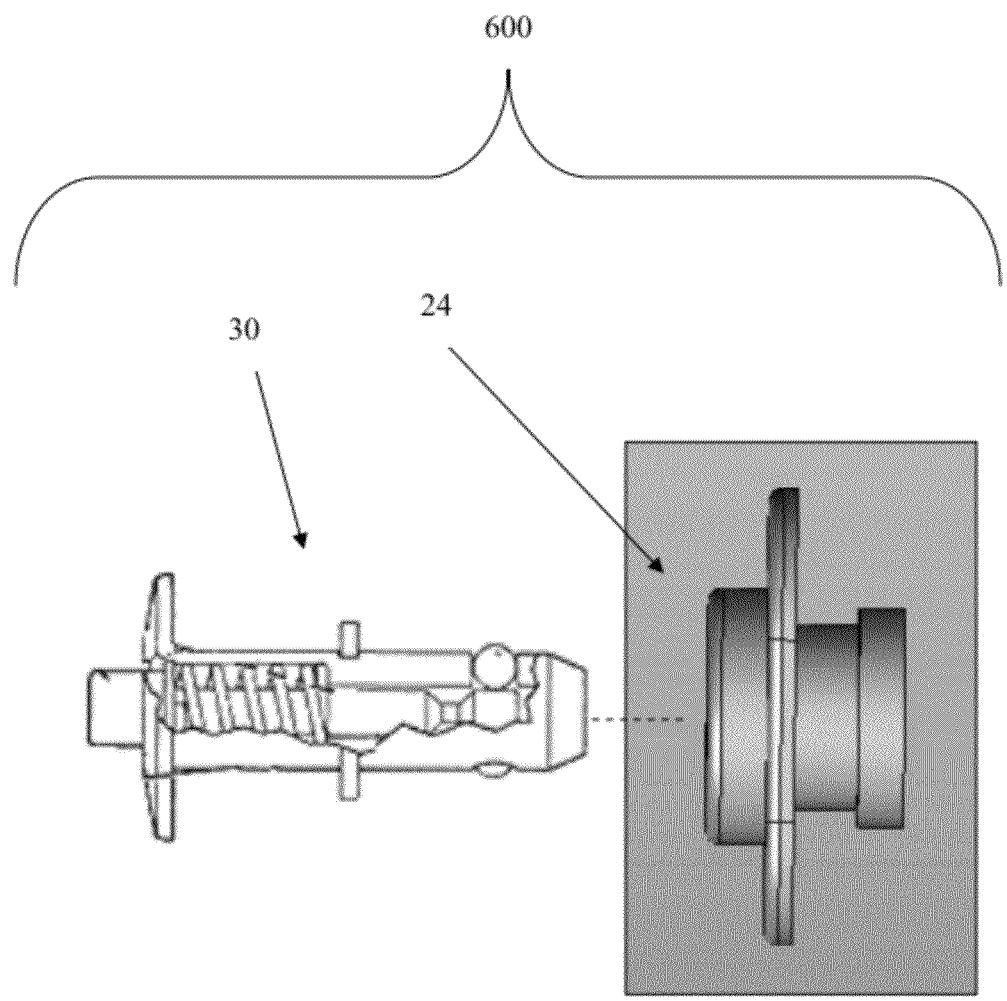
FIG. 6 is a perspective, partially broken-away view of an optional aspect of the foregoing embodiments.

Turning to FIG. 6, a strap pin (30) may be sized and shaped for receipt within receptacle port (24). As discussed hereinabove, receptacle port (24) may be mounted on the musical instrument to receive the first coil housing (14). By using a strap pin to occupy the receptacle port (24), when charging is not taking place, multiple benefits are provided: the pin protects the port (24) and consequently the coil (34) and coil housing (10); it provides a point of attachment for an instrument strap, while substantially eliminating the need for an additional penetration into the body of the instrument to insert a strap attachment point.

Referring to the following table, a method is described for contactless charging of a portable power source on an instrument.

TABLE 1

| | |
|---|---|
| 600 | configuring an instrument stand to support a musical instrument thereon; |
| 602 | integrally disposing a first contactless charging port on said music stand; |
| 604 | configuring the first contactless charging port for substantially continuous physical electric contact with a power source; |
| 606 | configuring a charging circuit module for being disposed on the musical instrument in physical electrical contact therewith; |
| 608 | providing the charging circuit module with circuit elements configured to provide at least one predetermined voltage to at least one rechargeable power supply; |
| 610 | disposing a second contactless charging port in physical electrical contact with said circuit elements; |
| 612 | configuring the second contactless charging port for contactless charging engagement with said first contactless charging port to receive power from the power source; |
| 614 | engaging the first contactless charging port with said second contactless charging port thereby initiating charging of rechargeable power supply. |

As shown, a method for charging an electronic musical instrument includes configuring 600 an instrument stand to support a musical instrument thereon. A first contactless charging port is integrally disposed on the music stand at 602. The first contactless charging port is configured 604 for substantially continuous physical electric contact with a power source. A charging circuit module is configured 606 for being disposed on the musical instrument in physical electrical contact therewith. At 608, the charging circuit module is provided with circuit elements configured to provide at least one predetermined voltage to at least one rechargeable power supply. A second contactless charging port is disposed 610 in physical electrical contact with said circuit elements. The second contactless charging port is configured 612 for contactless charging engagement with said first contactless charging port to receive power from the power source. The first contactless charging port is engaged 614 with the second contactless charging port.

The foregoing embodiments enable contactless charging, such as induction, to substantially eliminate the need to make a direct physical electrical connection with the instrument. Instead, the musical instrument is simply placed on a stand, as those skilled in the art will recognize is commonly done during breaks or when otherwise not in use. Charging begins automatically. The instrument may then be picked up at substantially any time for further use without having to detach, or unplug, a traditional direct connection. These embodiments thus enable charging without the need for exposed contact points which may be degraded by deposits or oxidation and fail to make a reliable connection. These embodiments also tend to enhance the aesthetics and physical (and tonal) integrity of the musical instrument by eliminating the need for making multiple penetrations into the instrument in order to charge multiple batteries. Embodiments of the present invention thus provide an unobtrusive and minimally intrusive means of recharging one or more batteries of varying voltages in an electric musical instrument without disconnecting the batteries from the instrument, without making multiple penetrations, and without requiring the use of a fixed cable.

Although embodiments disclosed herein make use of inductive charging, it should be recognized that substantially any approach capable of transferring electric power without physical electrical contact, such as, for example, capacitive coupling, may be used without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A contactless charging system for an electronic musical instrument, the system comprising:
   an instrument stand configured to support a musical instrument thereon, the instrument including a plurality of electronic components each operable at mutually distinct and different predetermined voltages, said electronic components including at least one wireless transmitter disposed in physical electrical contact with at least one rechargeable power supply;
   a first contactless charging port module integrally disposed on said stand, said first contactless charging port module including an induction coil disposed in physical electrical contact with a transformer;
   said first contactless charging port configured for substantially continuous physical electric contact with a power source;
   a charging circuit module configured for being disposed on the musical instrument in physical electrical contact therewith;
   said charging circuit module including circuit elements configured to provide the plurality of mutually distinct and different predetermined voltages usable by said plurality of electronic components, wherein said charging circuit module is configured to charge said at least one rechargeable power supply;
   said charging circuit module including a second contactless charging port disposed in physical electrical contact with said circuit elements;
   said second contactless charging port configured for contactless charging engagement with said first contactless charging port to receive power from the power source.

2. The system of claim 1, comprising the at least one rechargeable power supply disposed in physical electrical contact with said circuit elements.

3. The system of claim 2, comprising the electronic musical instrument.

4. The system of claim 3, wherein said electronic musical instrument comprises an electric guitar.

5. The system of claim 3, wherein said electronic component comprises a pick-up.

6. The system of claim 3, wherein said electronic musical instrument is selected from the group consisting of horns, drums, stringed instruments, and combinations thereof.

7. The system of claim 3, wherein said electronic component is selected from the group consisting of microphones, amplifiers, pickups, sound modifiers, wireless transmitters, and combinations thereof.

8. The system of claim 1 wherein said charging circuit module is configured to provide a plurality of predetermined voltages to a plurality of electrically independent rechargeable power supplies.

9. The system of claim 8 comprising the plurality of electrically independent rechargeable power supplies disposed in physical electrical contact with said charging circuit module.

10. The system of claim 9, comprising the electronic musical instrument, said instrument having a plurality of electronic instrument components engagable in physical electrical contact with said plurality of rechargeable power supplies.

11. The system of claim 1 where said first and second contactless charging ports comprise inductive charging ports.

12. The system of claim 1, comprising a switch disposed to switchably supply power to said first contactless charging port when said second contactless charging port is disposed in operative engagement with said first contactless charging port.

13. The system of claim 1 wherein said instrument stand is configured for being mounted on a horizontal surface.

14. The system of claim 1 wherein said instrument stand is configured for being mounted on a vertical surface.

15. The system of claim 2 wherein said at least one rechargeable power supply comprises a battery.

16. The system of claim 1 wherein said charging circuit module comprises a power level indicator configured to generate an output when power of the at least one rechargeable power supply is below a predetermined threshold.

17. An electronic musical instrument comprising:
    a body having a plurality of electronic instrument components each operable at mutually distinct and different predetermined voltages, said electronic components including at least one wireless transmitter disposed in physical electrical contact with at least one rechargeable power supply;
    a charging circuit module disposed on said body, in physical electrical contact with the electronic instrument components;
    at least one rechargeable power supply disposed in physical electrical contact with said charging circuit module;
    said charging circuit module configured to provide the plurality of mutually distinct and different predetermined voltages usable by said plurality of electronic components;
    a contactless charging port module disposed in physical electrical contact with said charging circuit module, said contactless charging port module including an induction coil disposed in physical electrical contact with a transformer;
    said contactless charging port module configured for contactless charging engagement with a power source to supply power to said at least one rechargeable power supply.

18. The instrument of claim 17, comprising an instrument stand configured to support said musical instrument thereon, said instrument stand connected to the power source and configured to mate with said contactless charging port to forming a contactless electrical coupling therebetween.

19. The instrument of claim 17 wherein said contactless charging port and said charging circuit module are disposed substantially within said body.

20. The instrument of claim 17 comprising a strap pin for a shoulder strap, said contactless charging port configured to releasably receive said strap pin therein.

21. A method for enabling an electric musical instrument to be charged, the method comprising:

(a) configuring an instrument stand to support a musical instrument thereon, the instrument including a plurality of electronic components each operable at mutually distinct and different predetermined voltages, said electronic components including at least one wireless transmitter disposed in physical electrical contact with at least one rechargeable power supply;
(b) integrally disposing a first contactless charging port module on said stand, said first contactless charging port module including an induction coil disposed in physical electrical contact with a transformer;
(c) configuring the first contactless charging port for substantially continuous physical electric contact with a power source;
(d) configuring a charging circuit module for being disposed on the musical instrument in physical electrical contact therewith;
(e) providing the charging circuit module with circuit elements configured to provide the plurality of mutually distinct and different predetermined voltages usable by said plurality of electronic components, wherein said charging circuit module is configured to charge said to at least one rechargeable power supply;
(f) disposing a second contactless charging port in physical electrical contact with said circuit elements; and
(g) configuring the second contactless charging port for contactless charging engagement with said first contactless charging port to receive power from the power source when the instrument is supported by the stand.

22. A contactless charging system for an electric stringed instrument, said system comprising:

an instrument stand configured to hold the instrument, the instrument having at least one wireless transmitter disposed in physical electrical contact with at least one of a plurality of electrically independent rechargeable power supplies;
said instrument stand including a first contactless charging port module connected to said instrument stand and an electrical cord connected to said charging port and configured to supply said charging port with electricity when said cord is attached to an electrical outlet, said first contactless charging port module including an induction coil disposed in physical electrical contact with a transformer;
a charging module including a second contactless charging port configured to mate and be contactlessly electrically coupled with said first contactless charging port;
said second charging port electrically coupled to a circuit configured to manipulate electricity providing multiple mutually distinct and different predetermined voltages for charging said plurality of electrically independent rechargeable power supplies; and
the electric stringed instrument including at least two electronic components, including said wireless transmitter, being respectively connected to at least two of said plurality of electrically independent rechargeable power supplies, said rechargeable power supplies being physically electrically coupled to said circuit.

23. The system of claim 1, wherein the first contactless charging port module and the charging circuit module are respectively configured for being retrofitted onto conventional instrument stands and musical instruments.

* * * * *